(12) United States Patent
Katagiri

(10) Patent No.: US 8,665,542 B2
(45) Date of Patent: Mar. 4, 2014

(54) TAPE BUFFER USED TO REDUCE TAPE BACKHITCHES DURING WRITING OPERATIONS

(71) Applicant: International Business Machines Corporation, Armonk, NY (US)

(72) Inventor: Takashi Katagiri, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/706,246

(22) Filed: Dec. 5, 2012

(65) Prior Publication Data

US 2013/0155540 A1    Jun. 20, 2013

(30) Foreign Application Priority Data

Dec. 14, 2011    (JP) .................................. 2011-273880

(51) Int. Cl.
*G11B 27/36* (2006.01)
(52) U.S. Cl.
USPC .......................................................... 360/31
(58) Field of Classification Search
None
See application file for complete search history.

(56) References Cited

U.S. PATENT DOCUMENTS 6,856,479 B2   2/2005   Jaquette et al.
7,903,363 B2   3/2011   Itagaki et al.

FOREIGN PATENT DOCUMENTS

| JP | 2004-341925 A | 12/2004 |
| JP | 2005-63444 A | 3/2005 |
| JP | 2006-318571 A | 11/2006 |
| JP | 2007-73108 A | 3/2007 |

*Primary Examiner* — Paul Huber
(74) *Attorney, Agent, or Firm* — Zilka-Kotab, PC

(57) ABSTRACT

According to one embodiment, a method includes writing, to a regular recording region of a tape medium after having written a first data accumulated in a buffer to a temporary recording region of the tape medium without an accompanying backhitch, a first data group that includes the first data that has any gaps between data eliminated, predicting a second volume of a second data, to be written in response to a command that is sent after the first data has been written to the regular recording region, judging whether the first volume exceeds a first threshold and whether or the second volume exceeds a second threshold, and writing the second data to the regular recording region without an accompanying backhitch when it has been judged that the first volume exceeds the first threshold and the second volume exceeds the second threshold.

13 Claims, 6 Drawing Sheets

TAPE BUFFER USED TO REDUCE TAPE BACKHITCHES DURING WRITING OPERATIONS

RELATED APPLICATIONS

This application claims priority from Japanese Patent Application Serial No. 2011-273880 filed on Dec. 14, 2011, which is herein incorporated by reference.

BACKGROUND

The present invention relates to devices and methods for writing data using a buffer which reduces tape medium backhitches. Specifically, this invention relates to accumulating data sent from a higher order device to a buffer, and in response to a command sent from the higher order device, writing, the data accumulated in the buffer to the tape medium.

With a tape drive that writes data to a tape medium, the following process typically occurs: accumulate the data in a buffer, and then write the data to the tape medium from the buffer with timing that is convenient for the drive. In order to assure that all of the data sent to the drive will be written to the tape medium, the host sends to the drive a command (Write FM Non Immediate command) to forcibly write the data. Such forced writing from the buffer to the tape medium is called "synchronization."

Incidentally, if the tape medium is not stopped after synchronization has been performed, a gap will form on the tape medium between the data written lot the prior synchronization and the data written for the subsequent synchronization. The result is that a region of the tape medium becomes wasted. This necessitates performing a backhitch. Backhitching, is a series of operations defined by decelerating and stopping the forward speed of the tape medium, sending the tape medium in the reverse direction, thereafter attaining the position for writing again by sending the tape medium in the original direction, and then writing the next data. The next data cannot be written until this backhitch is completed. Because the backhitch requires approximately 2-3 seconds of time, performing a backhitch has a large impact on performance.

As technology for avoiding the described condition, there has been offered recursive accumulating backhitchless flush (RABF), as described in more detail in U.S. Pat. No. 6,856,479, for example. RABF is as method for writing a transaction (data to be written during synchronization) to a magnetic tape without performing backhitch by having the tape drive accumulate the transaction in a buffer and thereafter performing recursive consecutive writing of the transaction from the buffer to the magnetic tape. With RABF, the backhitch is not performed except when recursively writing accumulated transactions to the tape drive, and therefore performance and capacity are maximized by the ability to place transactions to be recursively written in continuation of preceding data.

When the transaction size (volume of data to be written during, synchronization) is small, the RABF method improves synchronization performance. But when the transaction size reaches a certain amount, the overhead operations increase for temporarily writing to a different location, and thereafter writing with recursion.

As a method for improving synchronization performance when the transaction size is large, there has been offered, the same wrap backhitchless flush method (SWBF) described in more detail in U.S. Pat. No. 7,903,363, for example. SWBF is a method for writing without backhitch, that is, without stopping the tape medium or moving it in the reverse direction, thereby imparting no adverse impact on the nominal capacity of the tape medium memory capacity.

The RABF method is effective technology when the transaction size is small, and the SWBF method is effective technology when the transaction size is large. Accordingly, in a tape drive, RABF may be used if the transaction size does not exceed a threshold and SWBF may be used if the transaction size does exceed the threshold.

However, in situations where the transaction size is comparatively large even though within a size wherein RABF is efficient, there is an increase in the number of times for temporarily writing data to a different place and then re-writing it to the originally intended place (the RABF cycle count), and performance drops due to the operational overhead. Due to this, a method of improving performance by reducing the number of RABF cycles would be beneficial.

BRIEF SUMMARY

In one embodiment, a device includes a buffer, logic adapted to accumulate data sent from a higher order device in the buffer; logic adapted to, in response to a command sent from the higher order device, selectively perform either: a first operation to write the data accumulated in the buffer to a regular recording region of a tape medium without an accompanying backhitch, or a second operation to write the data accumulated in the buffer to a temporary recording region of a tape medium without an accompanying backhitch, and to subsequently write to the regular recording region a data group that includes the data written to the temporary recording region that has any gaps between data eliminated prior to writing, to the regular recording region; an acquisition component adapted to acquire a first volume of first data, at a time that the first data has been written to the regular recording region, by either the first operation or the second operation having been performed in response to the command; a prediction component adapted to predict a second volume of second data to be written in response to a command which is sent after the first data has been written to the regular recording region; a judgment component adapted to judge whether or not the first volume acquired by the acquisition component exceeds a first threshold, and to judge whether or not the second volume predicted by the prediction component exceeds a second threshold; and a control component adapted to: control such that when the judgment component has judged that the first volume exceeds the first threshold and the second volume exceeds the second threshold, in response to the command sent after the first data has been written to the regular recording, region, the first operation is performed for the second data, and control such that when the judgment component has judged that the first volume exceeds the first threshold and the second volume does not exceed the second threshold, in response to the command sent after the first data has been written to the regular recording region, the second operation is performed for the second data.

In another embodiment, a device includes logic adapted to accumulate data sent from a higher order device in a buffer; logic, adapted to, in response to a command sent from the higher order device, selectively perform either; a first operation to write the data accumulated in the buffer to a regular recording region of a tape medium without an accompanying, backhitch, or a second operation to write the data accumulated in the buffer to a temporary recording region of the tape medium without an accompanying backhitch, and to subsequently write to the regular recording, region a data group that includes the data written to the temporary recording region that has any gaps between data eliminated prior to writing to the regular recording region; an acquisition component adapted to acquire a first volume of first data, at a time that the first data has been written to the regular recording region, by either the first operation or the second operation having been performed in response to the command; a prediction component adapted to predict a second volume of second data to be written in response to a command which is sent after the first data has been written to the regular recording region; a judgment component adapted to judge whether or not the first volume acquired by the acquisition component exceeds a first threshold, and to judge whether or not the second volume predicted by the prediction component exceeds the first threshold, and to judge whether or not the second volume predicted by the prediction component exceeds a second threshold that is smaller than the first threshold; and a control component adapted to: control such that when the judgment component has judged that the second volume exceeds the first threshold, in response to the command sent after the first data has been written to the regular recording region, the first operation is performed for the second data, control such that when the judgment component has judged that the first volume exceeds the first threshold and the second volume exceeds the second threshold, in response to the command sent after the first data has been written to the regular recording region, the first operation is performed for the second data, control such that when the judgment component has judged that the first volume exceeds the first threshold and the second volume does not exceed the second threshold, in response to the command sent after the first data has been written to the regular recording region, the second operation is performed for the second data, and control such that when the judgment component has judged that the first volume does not exceed the first threshold and the second volume does not exceed the second threshold, in response to the command sent after the first data has been written to the regular recording region, the second operation is performed for the second data.

In another embodiment, a method for writing data with a device includes writing to a regular recording region of a tape medium, in response to a command, after having written a first data accumulated in a buffer to a temporary recording region of the tape medium without an accompanying backhitch, a first data group that includes the first data written to the temporary recording region that has any gaps between data therein eliminated prior to writing the first data group to the regular recording region; acquiring a first volume of the first data group, at a time that the first data group has been written to the regular recording region; predicting a second volume of a second data, to be written in response to a command that is sent after the first data group has been written to the regular recording region; judging whether or not the acquired first volume exceeds a first threshold; judging whether or not the predicted second volume exceeds a second threshold; writing the second data to the regular recording region without an accompanying backhitch in response to the command sent after the first data group has been written to the regular recording region, when it has been judged that the acquired first volume exceeds the first threshold and the predicted second volume exceeds the second threshold; and writing to the regular recording region a second data group that includes the second data written to the temporary recording region that has any gaps between data eliminated prior to writing to the regular recording region when it has been judged that the acquired first volume exceeds the first threshold and the predicted second volume does not exceed the second threshold, in response to the command sent after the first data group has been written to the regular recording region, and after the second data has been written to the temporary recording region without an accompanying backhitch.

According to another embodiment, a computer program product for writing data with a device includes a computer readable storage medium having program code embodied therewith, the program code readable/executable by the device to: accumulate, by the device, in a buffer, data sent from a higher order device; in response to a command sent from the higher order device, selectively perform, by the device, either: a first operation to write the data accumulated in the buffer to a regular recording region of a tape medium without an accompanying backhitch, or a second operation to write the data accumulated in the buffer to a temporary recording region of the tape medium without an accompanying backhitch, and to subsequently write to the regular recording region a data group that includes the data written to the temporary recording region that has any gaps between data eliminated prior to writing to the regular recording region; wherein the computer program product causes the device to function as: an acquisition component adapted to acquire a first volume of first data, at a time that the first data has been written to the regular recording region, by either the first operation or the second operation having been performed in response to the command; a prediction component adapted to predict a second volume of second data to be written in response to a command which is sent after the first data has been written to the regular recording region; a judgment component adapted to judge whether or not the first volume acquired by the acquisition component exceeds a first threshold, and to judge whether or not the predicted second volume exceeds the first threshold, and to judge whether or not the predicted second volume exceeds a second threshold that is smaller than the first threshold; and a control component adapted to: control such that when the judgment component has judged that the acquired first volume exceeds the first threshold and the predicted second volume exceeds the second threshold, in response to the command sent after the first data has been written to the regular recording region, the first operation is performed for the second data; and control such that when the judgment component has judged that the acquired first volume exceeds the first threshold and the predicted second volume does not exceed the second threshold, in response to the command sent after the first data has been written to the regular recording region, the second operation is performed for the second data.

Other aspects and embodiments of the present invention will become apparent from the following detailed description, which, when taken in conjunction with the drawings, illustrate by way of example the principles of the invention.

BRIEF DESCRIPTION OF THE SEVERAL
VIEWS OF THE DRAWINGS

DETAILED DESCRIPTION

Figure 1:
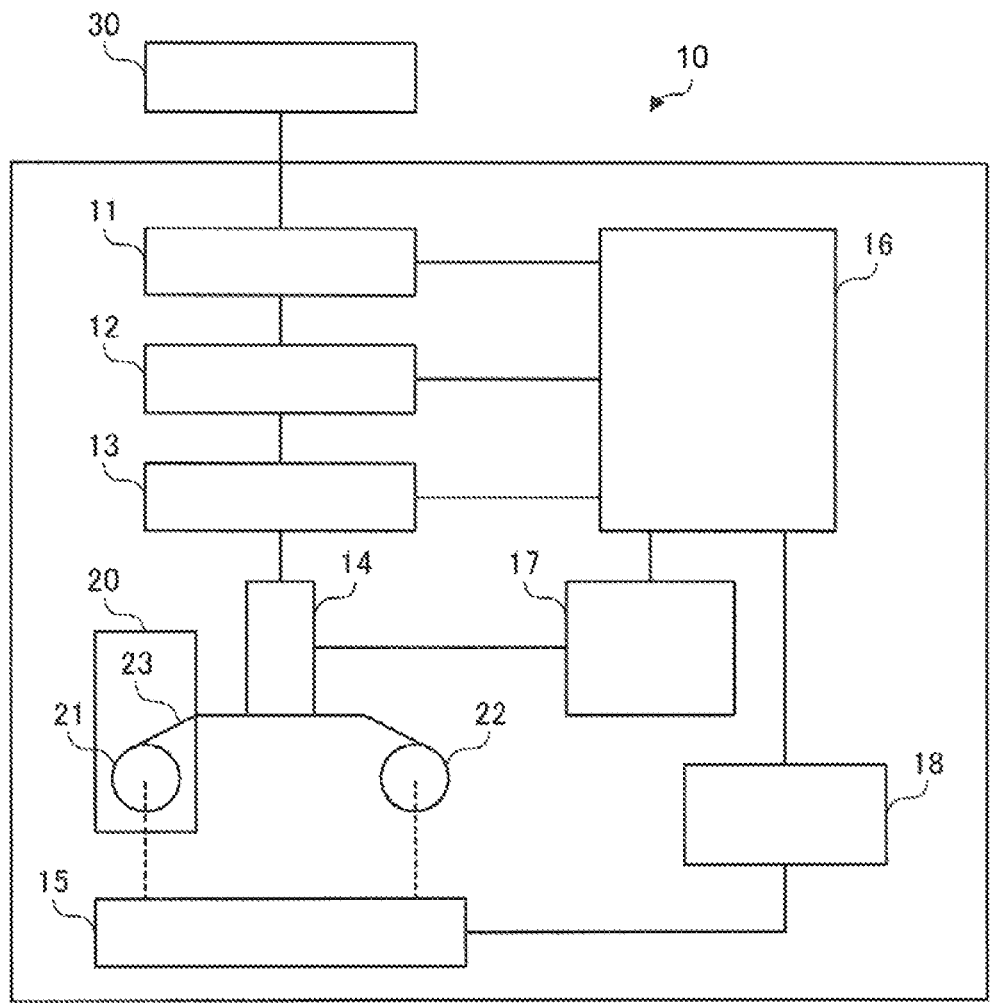
FIG. 1 is a block diagram that shows a structure of a tape drive implemented according to one embodiment.

The following description is made for the purpose of illustrating the general principles of the present invention and is not meant to limit the inventive concepts claimed herein. Further, particular features described herein may be used in combination with other described features in each of the various possible combinations and permutations.

Unless otherwise specifically defined herein, all terms are to be given their broadest possible interpretation including meanings implied, from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for writing data to tape medium with a reduced number of backhitches, as compared to conventional techniques.

In one general embodiment, a device comprises logic adapted to accumulate in a buffer data sent from a higher order device, and, in response to as command sent from the higher order device, logic adapted to selectively perform either: a first operation to write the data accumulated in the buffer to the regular recording region of a tape medium without accompanying backhitch; or, a second operation to write the data accumulated in the buffer to the temporary recording region of a tape medium without accompanying backhitch, and to thereafter write to the regular recording region a data group that includes the data written to the temporary recording region and that has eliminated gaps between data. The device further comprises; an acquisition component for acquiring a first volume, which is the volume of a first data, at the time that the first data has been written to the regular recording region by either the first operation or the second operation having been performed in response to the command; a prediction component for predicting a second volume, which is the volume of a second data, to be written in response to a command to be sent after the first data has been written to the regular recording region; a judgment component for judging whether or not the first volume acquired by the acquisition component exceeds a first threshold, and for judging whether or not the second volume predicted by the prediction component exceeds a second threshold; and a control component for controlling so that: when the judgment component has judged that the first volume exceeds the first threshold and the second volume exceeds the second threshold, in response to the command sent after the first data has been written to the regular recording region, the first operation will be performed for the second data; and for controlling so that: when the judgment component has judged that the first volume exceeds the first threshold and the second volume does not exceed the second threshold, in response to the command sent after the first data has been written to the regular recording region, the second operation will be performed for the second data.

In another embodiment, it is also acceptable for the control component to control so that: when the judgment component has judged that the first volume does not exceed the first threshold, in response to the command sent after the first data has been written to the regular recording region, the second operation will be performed for the second data.

Moreover, with this device according to another embodiment, it is also acceptable for the judgment component to further judge whether or not the second volume predicted by the prediction component exceeds a third threshold that is larger than the second threshold; and for the control component to control so that: when the judgment component has judged that the second volume exceeds the third threshold, in response to the command sent after the first data has been written to the regular recording region, the first operation will be performed for the second data.

According to another general embodiment, a device accumulates in a buffer data sent from a higher order device, and, in response to a command sent from the higher order device, the device selectively performs either: a first operation to write the data accumulated in the buffer to the regular recording region of a tape medium without accompanying backhitch; or, a second operation to write the data accumulated in the buffer to the temporary recording region of a tape medium without accompanying backhitch, and to thereafter write to the regular recording region a data group that includes the data written to the temporary recording region and that has eliminated gaps between data. The device also comprises: an acquisition component for acquiring a first volume, which is the volume of a first data, at the time that the first data has been written to the regular recording region by either the first operation or the second operation having been performed in response to the command; a prediction component for predicting a second volume, which is the volume of a second data to be written in response to a command to be sent after the first data has been written to the regular recording region; a judgment component for judging whether or not the first volume acquired by the acquisition component exceeds a first threshold, and for judging whether or not the second volume predicted by the prediction component exceeds the first threshold, and for judging whether or not the second volume predicted by the prediction component exceeds a second threshold that is smaller than the first threshold; and a control component for controlling so that: when the judgment component has judged that the second volume exceeds the first threshold, in response to the command sent after the first data has been written to the regular recording region, the first operation will be performed for the second data; and for controlling so that: when the judgment component has judged that the first volume exceeds the first threshold and the second volume exceeds the second threshold without exceeding the first threshold, in response to the command sent after the first data has been written to the regular recording region, the first operation will be performed for the second data; and for controlling so that: when the judgment component has judged that the first volume exceeds the first threshold and the second volume does not exceed the second threshold, in response to the command sent after the first data has been written to the regular recording region, the second operation will be performed for the second data; and for controlling so that: when the judgment component has judged that the first volume does not exceed the first threshold and the second volume does not exceed the second threshold, in response to the command suit after the first data has been written to the regular recording region, the second operation will be performed for the second data.

A method, according to another general embodiment, for writing data with a device comprises, using the device, accumulating in a buffer data sent from a higher order device, and, in response to a command sent from the higher order device, writing the data accumulated in the buffer to the regular recording region of a tape medium. The method also comprises the steps of: writing, in response to the command, after having written a first data accumulated in the buffer to the regular recording region of a tape medium without accompanying backhitch, to the regular recording region of a tape medium, a first data group that includes a first data written to the temporary recording region and that has eliminated gaps between data; acquiring a first volume, which is the total volume of the first data group, at the time that the first data group has been written to the regular recording region; predicting a second volume, which is the volume of a second data, to be written in response to a command to be sent after the first data group has been written to the regular recording region; judging whether or not the acquired first volume exceeds a first threshold; judging whether or not the predicted second volume exceeds a second threshold; writing, when it has been judged that the first volume exceeds the first threshold and the second volume exceeds the second threshold, in response to the command sent after the first data group has been written to the regular recording region, the second data to the regular recording region without accompanying backhitch; and, writing, when it has been judged that the first volume exceeds the first threshold and the second volume does not exceed the second threshold, in response to the command sent after the first data group has been written to the regular recording region, and after the second data has been written to the temporary recording region without accompanying backhitch, a second data group that includes the second data written to the temporary recording region and that has eliminated gaps between data, to the regular recording region.

In another embodiment, this method may further comprise the steps of: acquiring, at the time the second data has been written to the regular recording region, a second volume; predicting a third volume, which is the volume of a third data to be written in response to a command sent after the second data has been written to the regular recording region; judging whether or not the acquired second volume exceeds the first threshold; judging whether or not the predicted third volume exceeds the second threshold; writing, when it has been judged that the second volume exceeds the first threshold and the third volume exceeds the second threshold, in response to the command sent after the second data has been written to the regular recording region, the third data to the regular recording region without accompanying backhitch; and, writing, when it has been judged that the second volume exceeds the first threshold and the third volume does not exceed the second threshold, in response to the command sent after the second data group has been written to the regular recording region, and after the third data has been recorded to the temporary recording region, a third data group that includes the third data recorded to the temporary recording region and that has eliminated gaps between data, to the regular recording, region.

According to yet another general embodiment, a computer program product may comprise a computer readable storage medium having program code embodied therewith, the program code being readable/executable by a tape drive, which causes the tape drive to accumulate in a buffer data sent from a higher order device, and, in response to a command sent from the higher order device, to selectively perform either: a first operation to write the data accumulated in the buffer to the regular recording region of a tape medium without accompanying backhitch; or, a second operation to write the data accumulated in the buffer to the temporary recording region of a tape medium without accompanying backhitch, and to thereafter write to the regular recording, region a data group that includes the data written to the temporary recording region and that has eliminated imps between data. The computer readable program code may further cause the tape drive to function as: an acquisition component for acquiring a first volume, which is the volume of a first data, at the time that the first data has been written to the regular recording region by there having been performed either the first operation or the second operation in response to the command; a prediction component for predicting a second volume, which is the volume of a second data, to be written in response to a command to be sent after the first data has been written to the regular recording region; a judgment component for judging whether or not the first volume acquired by the acquisition component exceeds a first threshold, and for judging whether or not the second volume predicted by the prediction component exceeds a second threshold; and a control component for controlling so that: when the judgment component has judged that the first volume exceeds the first threshold and the second volume exceeds the second threshold, in response to the command sent after the first data has been written to the regular recording region, the first operation will be performed for the second data; and for controlling so that: when the judgment component has judged that the first volume exceeds the first threshold and the second volume does not exceed the second threshold, in response to the command sent after the first data has been written to the regular recording region, the second operation will be performed for the second data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system," Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through in type of network, including a local area network (LAN) or a wide area network (WAN), or the connection may be made to an external computer example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

By use of the embodiments and approaches described herein, an ability to improve performance by reducing the number of RABF cycles is possible, when writing data to a tape medium.

FIG. 1 is a block diagram that shows a structural example of tape drive 10 implemented according to one embodiment. Tape drive 10 comprises host interface (hereafter, "host I/F") 11, buffer 12, channel 13, head 14, and motor 15. It also includes controller 16, head position control system 17, and motor driver 18. Furthermore, a tape cartridge may be removably inserted into the tape drive 10, as shown in the drawing by tape cartridge 20. Tape cartridge 20 comprises reel 21/22 and tape 23. Tape 23 moves in its lengthwise direction from reel 21 toward reel 22 or from reel 22 toward reel 21, in conjunction with the rotation of reel 21/22. A magnetic tape is shown for tape 23, but a tape medium other than magnetic tape may be used, as known in the art.

Host I/F 11 performs communications with host 30, being an example of a higher order device. For example, host I/F may receive from host 30 a command to instruct writing of data to tape 23, a command to cause moving of tape 23 to a target position, and a command to instruct reading of data from tape 23. This host I/F 11 follows a communications standard, with SCSI being provided as an example thereof. With SCSI, the first command is equivalent to the Write command, the second command is equivalent to the Locate command or the Space command, and the third command is equivalent to the Read command. Additionally, host I/F 11 returns a response to host 30 on whether the processing for the described commands has succeeded or failed.

Buffer 12 is memory for accumulating data to be written to tape 23 and data read from tape 23. It may be structured as dynamic random access memory (DRAW, for example, or some other suitable memory type known in the art. Buffer 12 comprises a plurality of buffer segments, and each buffer segment stores datasets in units for writing to tape 23.

Channel 13 is a communications route used for sending to head 14 the data to be written to tape 23 and for receiving from head 14 the data to be read from tape 23.

Head 14 writes information to tape 23 and reads information from tape 23, at the time tape 23 moves in its lengthwise direction.

Motor 15 causes rotation of reel 21/22. A single motor 15 is shown by a rectangle in the drawing, but it is preferable to establish two motors, one for each of reel 21 and reel 22.

Controller 16 controls the entire structure of tape drive 10. For example, in compliance with a command received from host I/F 11, it controls writing of data to tape 23 and reading of data from tape 23, in some approaches. It also controls head position control system 17 and motor driver 18.

Head position control system 17 is a system for tracking a desired single wrap or plurality of wraps. Here, a wrap is a group of multiple tracks on tape 23. When a need to switch the wrap occurs, head 14 is electrically switched, and therefore head position control system 17 controls this switching. Motor driver 18 drives motor 15. When using two units of motor 15, as described above, two units of motor driver 18 are established.

With the tape drive 10 as described herein according to one embodiment, there may be considered the situation in which RABF is started if the transaction size exceeds a threshold, and SWBF is started if the transaction size does not exceed the threshold. In this situation, by switching to SWBF when the transaction size has exceeded the threshold, performance is markedly improved. However, there has been room for improving performance in near the vicinity of the transaction size switching point from RABF to SWBF.

Therefore, with the implementation mode described herein, there is offered a method for improving, performance by reducing the generation frequency of backhitches at locations originally expected to be written with RABF, when the transaction size is comparatively large within the range for the size in which RABF is started.

Because this implementation mode improves RABF in such a way, the following section first describes the general operations of RABF.

Figure 2:
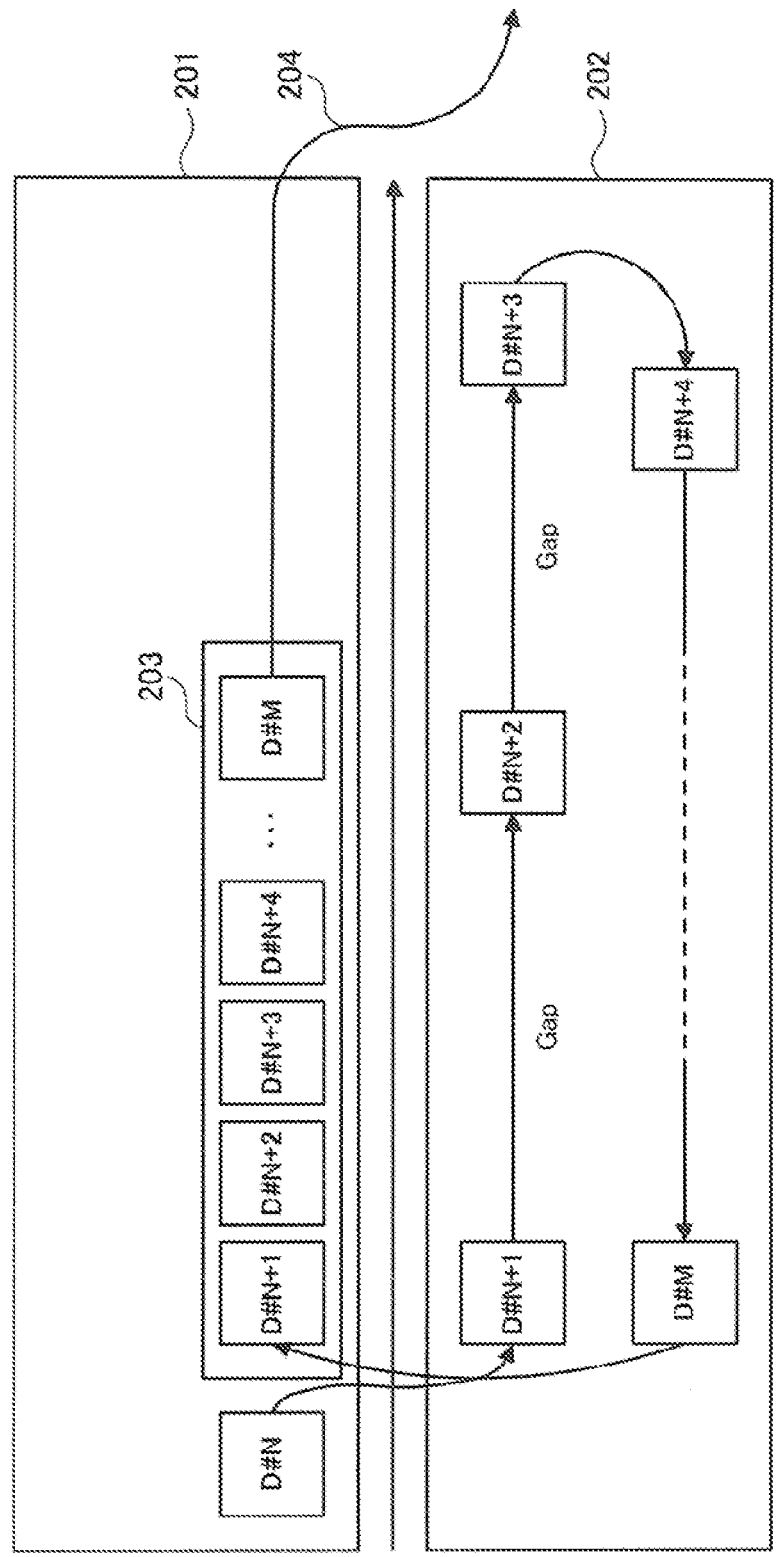
FIG. 2 is a pattern drawing that shows general movements of recursive accumulating backhitchless flush (RABF).

FIG. 2 is a pattern drawing that shows the general movements of RABF. Here, the data to be written during synchronization (data for a one-time transaction) is presented by a rectangle, and data with ordinal "i" would be expressed as "D#i".

In FIG. 2, after writing data "D#N" to regular wrap 201, which is an example of a normal recording region, the size (transaction size) of the next data "D#N+1" is below the threshold, so data "D#N+1," "D#N+2," "D#N+3," "D#N+4" ... "D#M" are written to ABF wrap 202, which is an example a temporary recording region. Thereafter, when a fixed condition has been met, the data written to ABF wrap 202 is written to regular wrap 201 as recursive write data 203 while eliminating gaps (ideally without gaps).

The fixed condition is any condition, such as one of those described below, according to various embodiments.

The first condition is a condition in which open capacity in buffer 12 has been eliminated. The data to be written to ABF wrap 202 must be accumulated in buffer 12 for recursive writing to regular wrap 201, and therefore such a condition is adopted.

The second condition is a condition in which all regions capable of writing data in ABF 202 have been eliminated.

The third condition is a condition in which a write error has been generated at ABF wrap 202.

The fourth condition is a condition in which write processing has ended and there has been received an ejection request (unload command) for tape 23.

Generally, at processing of data with a comparatively large transaction size, recursive writing is performed due to the first condition having been met; at processing, of data with a comparatively small transaction size, recursive writing is performed due to the second condition having been met.

With this regular RABF method, when the writing of recursive writing data 203 has been completed in this way, the next data is written again to ABF wrap 202, as shown by arrow 204.

Figure 3:
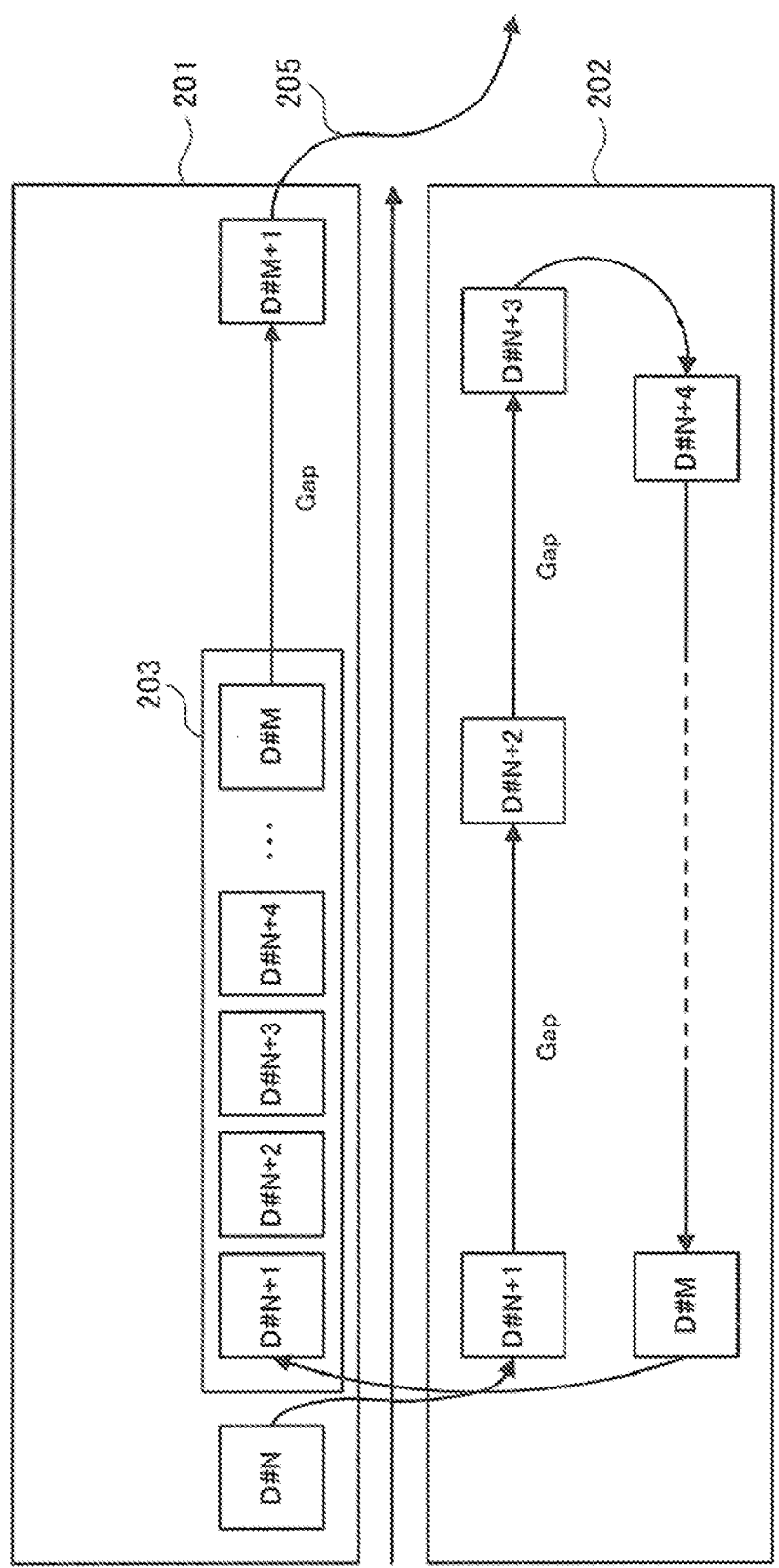
FIG. 3 is a pattern drawing that shows movements of as method according to one embodiment.

FIG. 3 is a pattern drawing that shows movements of a method according to one embodiment. Here as well, the data to be written during synchronization (data for a one-time transaction) is presented by a rectangle, and data with ordinal "i" would be expressed as "D#i".

In FIG. 3, the process is the same as that of FIG. 2 up to the writing of recursive writing data 203. However, in FIG. 3 with this implementation mode, when the writing of recursive writing data 203 has ended, depending on the predicted transaction size of following data "D#M+1", the capacity of recursive writing data 203 and the following "D#M+1" are written to regular wrap 201, without backhitch, using an operation similar to that of SWBE. Then, the data subsequent to that is written to ABF wrap 202, identically to FIG. 2, as shown by arrow 205.

In this way, this implementation mode does not write to ABF wrap 202 data for a one-time transaction for a plurality of RABF cycles. This reduces the number of RABF cycles and improves performance.

In addition, with this implementation mode, when writing to tape 23 data with a somewhat small transaction size by starting SWBF, the operation for collective write, which is recursive write, is considered a single transaction, so there is skipping of backhitch until after this collective write. In this way, unneeded backhitch is skipped, thereby preventing a drop in capacity for tape 23.

Moreover, in FIG. 3, data "D#N+1," "D#N+2," "D#N+3," "D#N+4" ... "D#M" are all pans of an example of a first data, and recursive write data 203, which includes these data parts, is an example of a first data group. Additionally, data "D#M+1" is an example of a second data, and by positing that "D#M+1" had been written to ABE wrap 202 due to the transaction size of the capacity of recursive write data 203 and data "D#M+1," the recursive write data that includes data "D#M+1" to be thereafter written to regular wrap 201 becomes an example of a second data group. By further positing that data "D#M+2" will be written after having written data "D#M+1" to regular wrap 201, this data "D#M+2" becomes an example of a third data and; by positing that data "D#M+2" has been written to ABF wrap 202 due to the transaction size of data "D#M+1," the recursive write data that includes data "D#M+2" to be thereafter written to regular wrap 201 becomes an example of a third data group.

Figure 4:
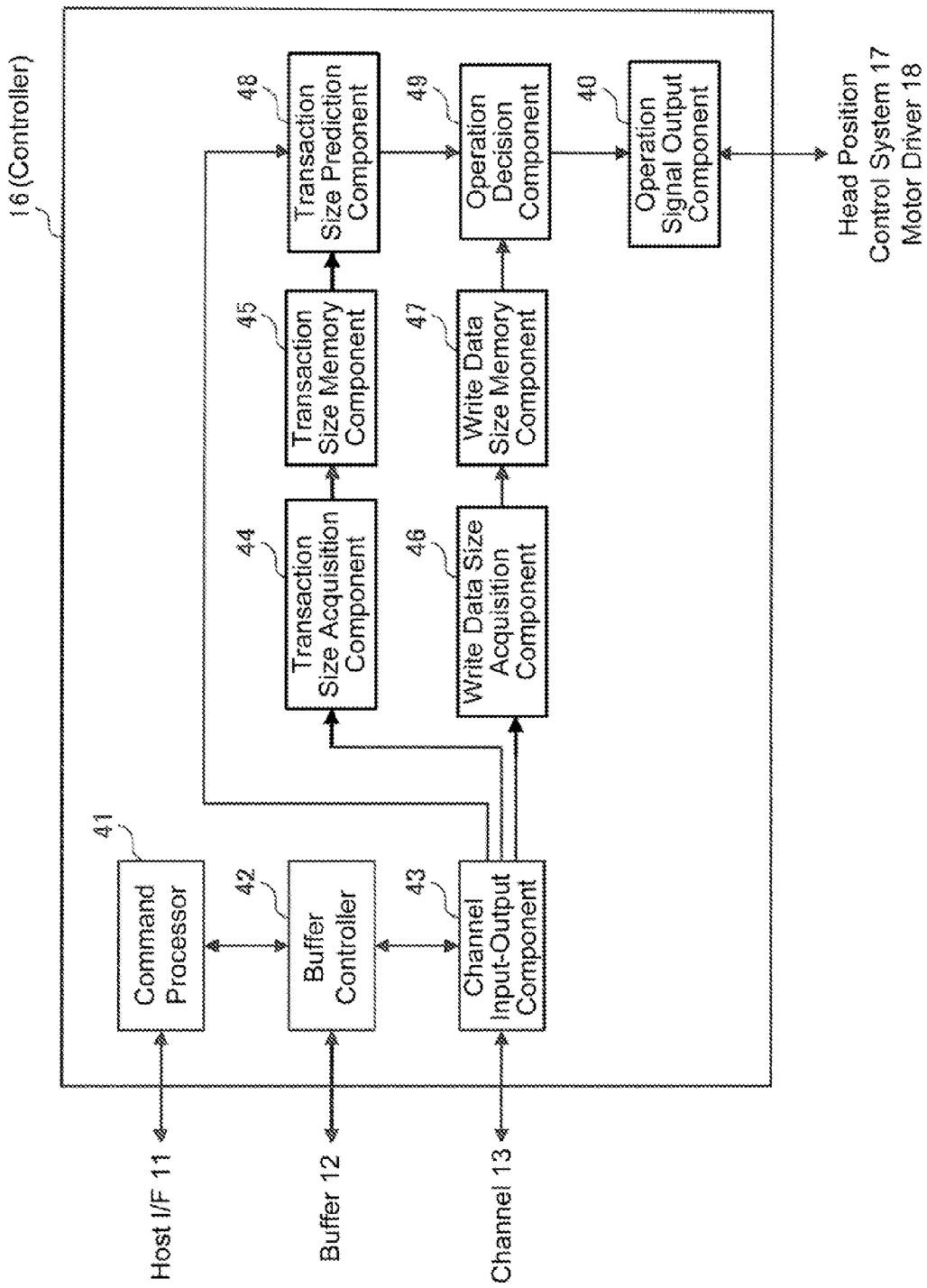
FIG. 4 is a block diagram that shows a functional structure of a controller according to one embodiment.

FIG. 4 is a block diagram that shows the functional structure of a controller 16 according to one embodiment. As shown, controller 16 comprises command processor 41, buffer controller 42, and channel input-output component 43. It also comprises transaction size acquisition component 44, transaction size memory component 45, write data size acquisition component 46, and write data size memory component 47. Furthermore, it comprises transaction size prediction component 48, operation decision component 49, and operation signal output component 40.

Of these, command processor 41 receives commands from host I/F 11. Here, the command is a Write command to instruct the storing of data in buffer 12 or a synchronization command (such as the Write FM command) to for writing the data stored in buffer 12 to tape 23.

When command processor 41 receives a Write command, buffer controller 42 prepares the data within buffer 12. When command processor 41 receives a synchronization, butler controller 42 reads the data from buffer 12 and outputs it to channel input-output, component 41.

Channel input-output component 43 outputs to channel 13 the data that buffer controller 42 has read from buffer 12, and it stores the data received from channel 13 in buffer 12. Additionally, it executes a judgment about the dataset each time a dataset is written to tape 23, and, based on the judgment result, it instructs transaction size acquisition component 44 to start or terminate the acquisition of the transaction size, or it instructs write data size acquisition component 46 to start or terminate acquisition of the write data size.

Transaction size acquisition component 44 acquires the size of the data (transaction size) that has been written from the write time per the prior synchronization command or the first write time until the write time per the current synchronization command, each time data is to be written to tape 23 for a synchronization command.

Transaction size memory component 45 stores in a time series the transaction size acquired by transaction size acquisition component 44.

Write data size acquisition component 46 acquires the size of the data that has been written from the write time per the prior synchronization command or the first write time until the write time per the current synchronization command, or acquires the size of the data that has been written by recursive write, each time data is to be written to tape 23 for a synchronization command. Here, the size of the data that has been written is called the "write data size." With this implementation mode, as an example of the first data, there is used the written data, and as an example of the first volume that is the volume of the first data, there is used the write data size. Additionally, as an example of the acquisition component that acquires the first volume, there is established write data size acquisition component 46.

Write data size memory component 47 stores the write data size that write data size acquisition component 46 has acquired.

Based on the transaction size history stored in transaction size memory component 45, transaction size prediction component 48 predicts the size of the data (transaction size) that will be written to tape 23 for the next synchronization command. With this implementation mode, as an example of a second data, there is used data to be written to tape 23 per the next synchronization command, and as an example of the second volume that is the volume of the second data, there is used the transaction size of that data. Additionally, as an example of the acquisition component that acquires the second volume, there is established transaction size prediction component 48.

Based on whether or not the transaction size measured by transaction size prediction component 48 exceeds the threshold or the write data size stored in write data size memory component 47 exceeds the threshold, operation decision component 49 decides whether to perform either of an operation to await the next data at regular wrap 201 without backhitch or an operation to await the next data by shifting it to ABF wrap 202. With this implementation mode, as an example of the decision component that judges whether or not the first volume exceeds the first threshold and whether or not the second volume exceeds the first threshold, there is established operation decision component 49.

Operation signal output component 40 outputs a signal, to head position control system 17 and motor driver 18, for instructing the operation decided by operation decision component 49. With this implementation mode, as an example of the first operation, there is used an operation that awaits the next data at regular wrap 201 without backhitch, and, as an example of the second operation, there is used an operation that awaits the next data by shifting it to ABF wrap 202. Additionally, operation signal output component 40 is established as an example of a control component that controls so that: when it has been judged that the second volume exceeds the first threshold, and when it has been judged that the first volume exceeds the first threshold and the second volume exceeds the second threshold without exceeding the first threshold, the control is for the first operation to be performed for the second data; and, when it has been judged that the first volume exceeds the first threshold and the second volume does not exceed the second threshold, and, when it has been judged that the first volume does not exceed the first threshold and the second volume does not exceed the first threshold, the control is for the second operation to be performed for the second data.

Figure 5:
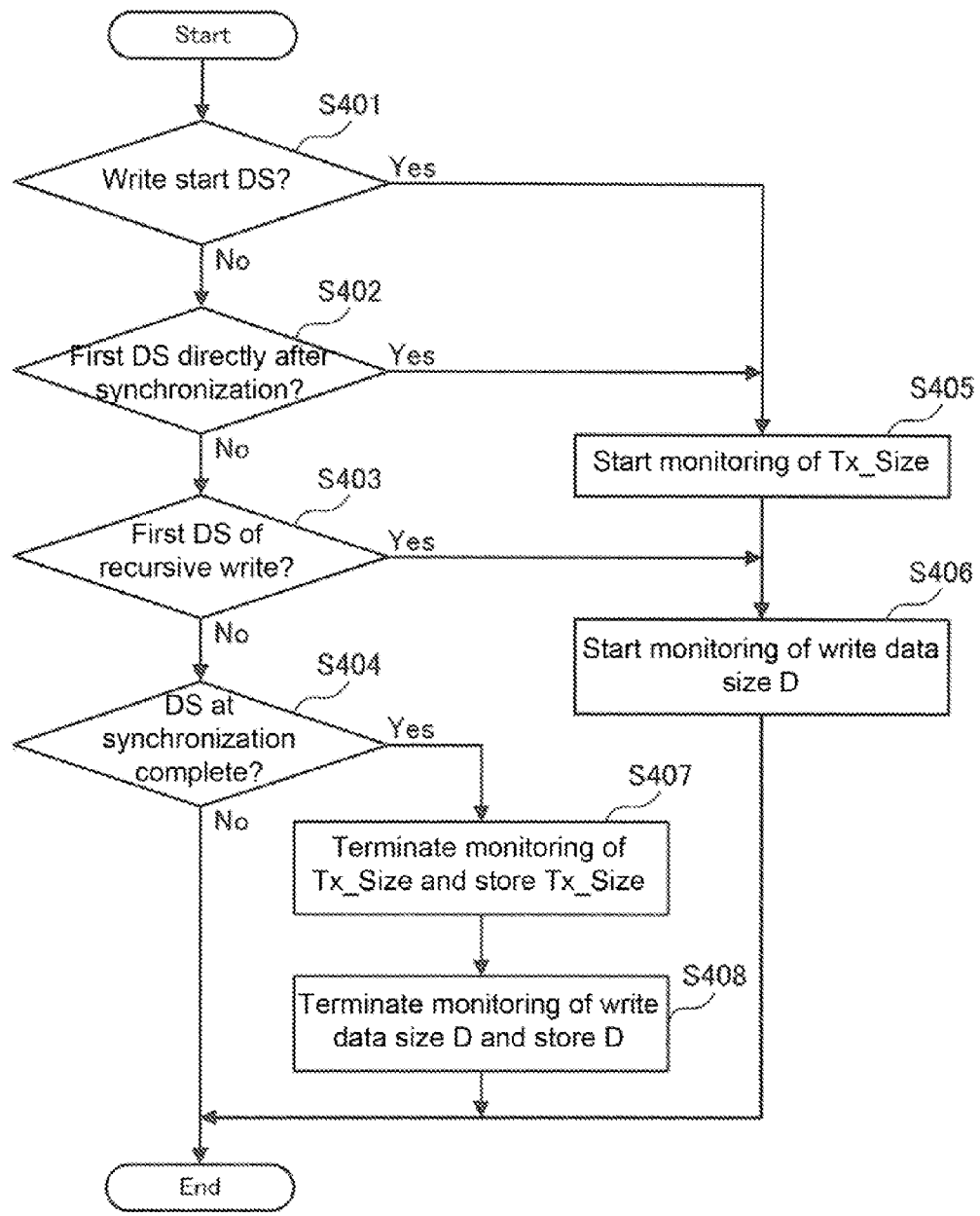
FIG. 5 is a flow chart that shows an operational example of the time of size collection with the controller according to one embodiment.

FIG. 5 is a flow chart that shows an operational example of a time controller 16 that collects the transaction size and write, data size, according to one embodiment. In this flow chart, Tx_Size expresses the transaction size, and D expresses the write data size. Furthermore, DS expresses the dataset, which is the minimum unit for data to be written to tape 23. The firmware executes the processing of this flow chart at the time the writing of the dataset has been completed, and it acquires Tx_Size and D.

At controller 16, channel input-output component 43 first judges whether or not the written dataset is a write start dataset (Step 401). Here, a write start dataset is such as a dataset being the first written after mourning, tape 23, or a dataset first written after performing an operation to read data from tape 23.

When channel input-output component 43 judges that the written dataset is a write start dataset, based on a start instruction for Tx_Size acquisition from channel input-output component 43, transaction size acquisition component 44 starts monitoring of Tx_Size (Step 405). Additionally, based on a start instruction for D acquisition from channel input-output component 43, write data size acquisition component 46 starts monitoring of D (Step 406).

When channel input-output component 43 judges that the written dataset is not a write start dataset, it next judges whether or not the written dataset is the first dataset in the writing process directly after synchronization has been performed (Step 402). Here, the first dataset in the writing process directly after synchronization has been performed is the dataset directly after synchronization for the time that data has been written in continuation on tape 23. Furthermore, data will be written to tape 23 even without the arrival of a synchronization command, and therefore the writing process directly after having performed synchronization includes writing not dependent on the synchronization command.

When channel input-output component 43 judges that the written dataset is the first dataset in the writing process directly after having performed synchronization, based on a start instruction for Tx_Size acquisition from channel input-output component 43, transaction size acquisition component 44 starts monitoring of Tx_Size (Step 405). Additionally, based on a start instruction for D acquisition from channel input-output component 43, write data size acquisition component 46 starts monitoring of D (Step 406).

Moreover, when channel input-output component 43 judges that the written dataset is not the first dataset in the writing process directly after having performed synchronization, it next judges whether or not the written dataset is the first dataset in recursive write (Step 403). Here, whether or not current writing is the first dataset in recursive write may be judged based on RABF status information recorded in a memory not shown in the drawing.

When channel input-output component 43 judges that the written dataset is the first dataset in recursive write, based on a start instruction for D acquisition from channel input-output component 43, write data size acquisition component 46 starts monitoring of D (in this case, the size of the recursive write data) (Step 406).

When channel input-output component 43 judges that the written dataset is not the hit dataset recursive write, it next judges whether or not the written dataset is the dataset at time of synchronization completion (Step 404).

When channel input-output component 43 judges that the written dataset is the dataset at time of synchronization completion, based on a termination instruction for Tx_Size acquisition from channel input-output component 43, transaction size acquisition component 44 terminates monitoring of Tx_Size (Step 407). Additionally, based on a termination instruction for D acquisition from channel input-output component 43, write data size acquisition component 46 terminates monitoring of D and stores D in write data size memory component 47 (Step 408).

Figure 6:
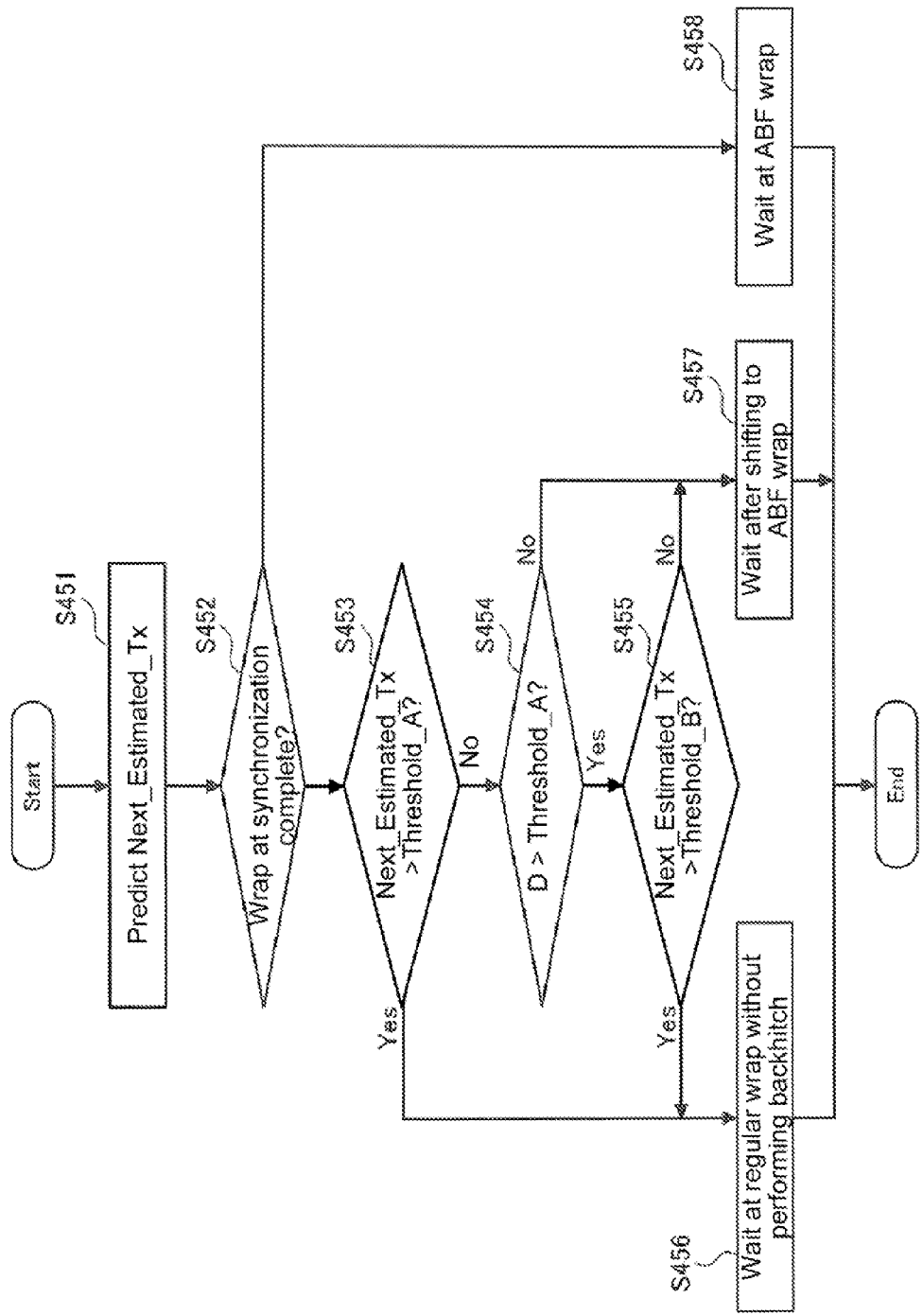
FIG. 6 is a flow chart that shows an operational example of the time of operation decision with the controller according to one embodiment.

FIG. 6 is a flow chart that shows an operational example of the time of deciding the operation when writing the next data, according to one embodiment. In this flow chart, Next_Estimated_Tx expresses the transaction size predicted for the next data, and D expresses the write data size. Additionally, Threshold_A expresses the threshold for switching between SWBF and RABF, and Threshold_B expresses the threshold for deciding not to perform SWBF because the result is small even though the value of D may be large. Here, Threshold_A and Threshold_B are set to values that form the relationship Threshold_A>Threshold_B. For example, when Threshold_A is set to 200 MB, Threshold_B may be set to 20 MB. Furthermore, when command processor 41 receives the synchronization command, buffer controller 42 reads the data accumulated in buffer 12 and channel input-output component 43 performs synchronization. Then, at the point when channel input-output component 43 has detected synchronization completion, this flow chart is executed.

At controller 16, by an instruction from channel input-output component 43, transaction size prediction component 48 predicts Next_Estimated_Tx, based on the history of past Tx_Size recorded in transaction size memory component 45 (Step 451). For example, Next_Estimated_Tx may be predicted by computing an average value for several past Tx_Size.

Next, channel input-output component 4 judges whether the wrap at which head 14 will be positioned at synchronization termination will be regular wrap 201 or ABF wrap 202 (Step 452).

The following section first describes processing when channel input-output component 43 has judged that the wrap at which head 14 will be positioned at synchronization termination will be regular wrap 201.

In this case, operation decision component 49 judges whether or not Next_Estimated_Tx predicted by transaction size prediction component 48 exceeds Threshold_A (Step 453).

If the result is that Next_Estimated_Tx exceeds Threshold_A, operation decision component 49 decides for SWBF operation, in other words, the operation that awaits preparation of write for next data at regular wrap 201 without immediately performing backhitch; and, based on an instruction from operation decision component 49, operation signal output component 40 instructs head position control system 17 and motor driver 18 to start that operation (Step 456). Specifically, it does not instruct head position control system 17 to switch the wrap, but does instruct motor driver 18 to move tape 23 at the current speed without performing backhitch.

Conversely, if the result is that Next_Estimated_Tx does not exceed Threshold_A, operation decision component 49 judges whether or not D stored in write data size memory component 47 exceeds Threshold_A (Step 454).

If it is judged that D exceeds Threshold_A, operation decision component 49 judges whether or not Next_Estimated_Tx predicted by transaction size prediction component 48 exceeds Threshold_B (Step 455).

Then, if it is judged that Next_Estimated_Tx exceeds Threshold 13, operation decision component 49 decides for SWBF operation, in other words, the operation that awaits preparation of write for next data at regular wrap 201 without immediately performing backhitch; and, based on an instruction from operation decision component 49, operation signal output component 40 instructs head position control system 17 and motor driver 18 to start that operation (Step 456). Specifically, it does not instruct head position control system 17 to switch the wrap, but does instruct motor driver 18 to move tape 23 at the current speed without performing backhitch.

If it is judged that Next_Estimated_Tx does not exceed Threshold_B, operation decision component 49 decides for RABF operation, in other words, the operation that awaits preparation of write for next data at regular wrap 201 after moving to ABF wrap 202; and, based on an instruction from operation decision component 49, operation signal output component 40 instructs head position control system 17 and motor driver 18 to start that operation (Step 457). Specifically, it instructs head position control system 17 to switch the wrap to ABF wrap 202, and it instructs motor driver 18 to move tape 23 at the current speed without performing backhitch.

On the other hand, if at Step 454 it is judged that D does not exceed Threshold_A, operation decision component 49 decides for RABF operation, in other words, the operation that awaits preparation of write for next data at regular wrap 201 after moving to ABF wrap 202; and, based on an instruction from operation decision component 49, operation signal output component 40 instructs head position control system 17 and motor driver 18 to start that operation (Step 457). Specifically, it instructs head position control system 17 to switch the wrap to ABF wrap 202, and it instructs motor driver 18 to move tape 23 at the current speed without performing backhitch.

The following section next describes processing when channel input-output component 43 has judged that the wrap at which head 14 will be positioned at synchronization termination will be ABF wrap 202.

In this case, operation decision component 49 decides for RABF operation, in other words, the operation that awaits preparation of write for next data at regular wrap 201 at ABF wrap 202; and, based on an instruction from operation decision component 49, operation signal output component 40 instructs head position control system 17 and motor driver 18 to start that operation (Step 458). Specifically, it does not instruct head position control system 17 to switch the wrap, and it instructs motor driver 18 to move tape 23 at the current speed without performing backhitch.

With this operation example, the threshold used at Step 453 and the threshold used at Step 454 were both Threshold_A, but there is no such limitation. For example, the threshold used at Step 453 could be made a Threshold_C, differing from Threshold_A but larger than Threshold_B. In this case, Threshold_C is an example of a third threshold.

With this operation example, Step 456 is executed when it has been judged at Step 453 that Next_Estimated_Tx exceeds Threshold_A, and steps from Step 454 are executed only when it has been judged at Step 453 that Next_Estimated_Tx does not exceed Threshold_A, but there is no such limitation. For example, it is acceptable to execute from Step 454 without condition, not judging at Step 453 whether or not Next_Estimated_Tx exceeds Threshold_A.

With this operation example, Step 457 is executed without condition when it has been judged at Step 454 that D exceeds Threshold_A, but there is no such limitation. For example, it is acceptable to advance to Step 457 only when some kind of condition has been met, and to advance to Step 455 when that condition has not been met.

Lastly, the effects of using this implementation mode are described using specific numerical values. Threshold_A is made 200 [MB] Threshold_B is made 20 [MB], and the size of buffer 12 is made 800 [MB]. The wrap turn time (time required to change the running, direction of tape 23) from first ABE wrap 202 to second ABF wrap 202 is made 1.5 [sec], the transfer rate from host 30 is made 100 [MB/sec], the transfer rate for writing to tape 23 is made 160 [MB/sec], and the transaction size is made 100 [MB].

To simplify the description, the following conditions are presumed. Firstly, when tape 23 is running, tape drive 10 has the ability to write the data to tape 23 simultaneous to receiving it from host 30. This delimits overhead during RARE to only the execution of backhitch, wrap turn, and recursive write. The overhead for one RABF cycle is the time for which the recursive write time is added to twice the wrap turn time; by using the above stated numbers, the time is 8 [sec] (=1.5 [sec]×2+800 [MB]/160 [MB/sec]).

Secondly, the condition for performing recursive write is made only the previously described first condition (the condition in which open capacity in buffer 12 has been eliminated).

Under the above described presumptions, the following compares the scenario in which 10000 [MB] of data has been written using regular RABF to the scenario in which the same data size has been written using the method of this implementation mode.

The following section first describes data written using regular RABF. The number of RABF cycles needed to write 10000 [MB] of data with regular RABF is 12.5 (=10000 [MB]/800 [MB]), and therefore the entire overhead becomes 100 [sec] (=8 [sec]×12.5). Accordingly, the actual transfer rate when tape drive 10 has written the data to tape 23 becomes 50 [MB/sec] (10000 [MB]/(10000 [MB/sec]+100 [sec])).

The following section next describes data written using, the method of this implementation mode. The number of RABF cycles needed to write 10000 [MB] of data with regular RABF is 11.1 (10000 [MB]/800 [MB]+100 [MB]), and therefore the entire overhead becomes 88.8 [sec](=8 [sec]× 11.1), an improvement of 11.2 [sec]. By calculating identically to the general RABF method, the actual transfer rate when tape drive 10 has written the data to tape 23 becomes approximately 53 [MB/sec]=10000 [MB] (10000 [MB]/1100 [MB/sec]+88.8 [sec])), a transfer rate improvement of approximately 3[MB/sec].

With this implementation mode, by using the transaction size predicted for the recursive write data and next data, after having performed recursive write with RABF, there is arranging for backhitchless write of the next data to regular wrap 201. Because this reduces the number of RABF cycles, it improves performance at writing of the data.

Furthermore, with this implementation mode, when data with a small transaction size is consecutive, there is arranging to not skip backhitch more than necessary, based on the judgment that it has been combined with the volume of the recursive write data. By skipping arbitrary backhitch, a more-than-necessary decrease in the capacity of tape 23 is suppressed.

The embodiments and approaches described, herein may be implemented entirely with hardware, or they may be implemented entirely with software, or they may be implemented with a combination of hardware and software. Furthermore, the embodiments and approaches described herein may be implemented as a computer, data processing system, or computer program. Such a computer program may be offered by storing it on a computer readable storage medium. The medium may be an electronic, magnetic, optical, electromagnetic, infrared or semiconductor system (or apparatus or device) or propagation medium. As examples of a computer readable medium, there may be offered a semiconductor or solid state memory, magnetic tape, mountable-removable computer diskette, random access memory (RAM), read only memory (ROM), rigid electromagnetic disk, or optical disc. As current examples of an optical disc, there may be offered a compact disc read-only memory (CD-ROM), a compact disc readable-writable memory (CD-R/W), and a DVD.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Of course, any of the logic described herein may be implemented as a method on any device and/or system or as a computer program product, according to various embodiments. It will also be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device, comprising:
 a buffer;
 logic adapted to accumulate data sent from a higher order device in the buffer;
 logic adapted to, in response to a command sent from the higher order device, selectively perform either:
  a first operation to write the data accumulated in the buffer to a regular recording region of a tape medium without an accompanying backhitch; or
  a second operation to write the data accumulated in the buffer to a temporary recording region of the tape medium without an accompanying backhitch, and to subsequently write to the regular recording region a data group that includes the data written to the temporary recording region that has any gaps between data eliminated prior to writing to the regular recording region;
an acquisition component adapted to acquire a first volume of first data, at a time that the first data has been written to the regular recording region, by either the first operation or the second operation having been performed in response to the command;
a prediction component adapted to predict a second volume of second data to be written in response to a command which is sent after the first data has been written to the regular recording region;
a judgment component adapted to judge whether or not the first volume acquired by the acquisition component exceeds a first threshold, and to judge whether or not the second volume predicted by the prediction component exceeds a second threshold; and
a control component adapted to:
control such that when the judgment component has judged that the acquired first volume exceeds the first threshold and the predicted second volume exceeds the second threshold, in response to the command sent after the first data has been written to the regular recording region, the first operation is performed for the second data; and
control such that when the judgment component has judged that the acquired first volume exceeds the first threshold and the predicted second volume does not exceed the second threshold, in response to the command sent after the first data has been written to the regular recording region, the second operation is performed for the second data.

2. The device as recited in claim 1, wherein the control component is further adapted to control such that when the judgment component has judged that the acquired first volume does not exceed the first threshold, in response to the command sent after the first data has been written to the regular recording region, the second operation is performed for the second data.

3. The device as recited in claim 2,
wherein the judgment component is further adapted to judge whether or not the second volume predicted by the prediction component exceeds a third threshold that is larger than the second threshold, and
wherein the control component is further adapted to control such that when the judgment component has judged that the second volume exceeds the third threshold, in response to the command sent after the first data has been written to the regular recording region, the first operation is performed for the second data.

4. The device as recited in claim 1,
wherein the judgment component is further adapted to judge whether or not the second volume predicted by the prediction component exceeds a third threshold that is larger than the second threshold, and
wherein the control component is further adapted to control such that when the judgment component has judged that the second volume exceeds the third threshold, in response to the command sent after the first data has been written to the regular recording region, the first operation is performed for the second data.

5. A method for writing data with a device, the method comprising:
writing to a regular recording region of a tape medium, in response to a command, after having written a first data accumulated in a buffer to a temporary recording region of the tape medium without an accompanying backhitch, a first data group that includes the first data written to the temporary recording region that has any gaps between data therein eliminated prior to writing the first data group to the regular recording region;
acquiring a first volume of the first data group, at a time that the first data group has been written to the regular recording region;
predicting a second volume of a second data, to be written in response to a command that is sent after the first data group has been written to the regular recording region;
judging whether or not the acquired first volume exceeds a first threshold;
judging whether or not the predicted second volume exceeds a second threshold;
writing the second data to the regular recording region without an accompanying backhitch in response to the command sent after the first data group has been written to the regular recording region, when it has been judged that the acquired first volume exceeds the first threshold and the predicted second volume exceeds the second threshold; and
writing to the regular recording region a second data group that includes the second data written to the temporary recording region that has any gaps between data eliminated prior to writing to the regular recording region, when it has been judged that the acquired first volume exceeds the first threshold and the predicted second volume does not exceed the second threshold, in response to the command sent after the first data group has been written to the regular recording region, and after the second data has been written to the temporary recording region without an accompanying backhitch.

6. The method as recited in claim 5, further comprising writing the second data group to the regular recording region, when it has been judged that the acquired first volume does not exceed the first threshold, in response to the command sent after the first data group has been written to the regular recording region, and after the second data has been recorded to the temporary recording region without accompanying backhitch.

7. The method as recited in claim 6, further comprising:
judging whether or not the predicted second volume exceeds a third threshold that is larger than the second threshold; and
writing the second data to the regular recording region without an accompanying backhitch when it has been judged that the second volume exceeds the third threshold, in response to the command sent after the first data group has been written to the regular recording region.

8. The method as recited in claim 5, further comprising:
acquiring a second volume at a time that the second data has been written to the regular recording region;
predicting a third volume of a third data to be written in response to a command sent after the second data has been written to the regular recording region;
judging whether or not the acquired second volume exceeds the first threshold;
judging whether or not the predicted third volume exceeds the second threshold;
writing, when it has been judged that the acquired second volume exceeds the first threshold and the predicted third volume exceeds the second threshold, in response to the command sent after the second data has been written to the regular recording region, the third data to the regular recording region without an accompanying backhitch; and writing, when it has been judged that the acquired second volume exceeds the first threshold and the predicted third volume does not exceed the second threshold, in response to the command sent after the second data group has been written to the regular recording region, and after the third data has been recorded to the temporary recording region, a third data group that includes the third data recorded to the temporary recording region to the regular recording region, wherein any gaps between data are eliminated prior to writing the third data group to the regular recording region.

9. The method as recited in claim 8, further comprising:
judging whether or not the predicted second volume exceeds a third threshold that is larger than the second threshold; and
writing the second data to the regular recording region without an accompanying backhitch when it has been judged that the predicted second volume exceeds the third threshold, in response to the command sent after the first data group has been written to the regular recording region.

10. The method as recited in claim 8, further comprising writing the second data group to the regular recording region, when it has been judged that the acquired first volume does not exceed the first threshold, in response to the command sent after the first data group has been written to the regular recording region, and after the second data has been recorded to the temporary recording region without accompanying backhitch.

11. The method as recited in claim 10, further comprising:
judging whether or not the predicted second volume exceeds a third threshold that is larger than the second threshold; and
writing the second data to the regular recording region without an accompanying backhitch when it has been judged that the predicted second volume exceeds the third threshold, in response to the command sent after the first data group has been written to the regular recording region.

12. The method as recited in claim 5, further comprising:
judging whether or not the predicted second volume exceeds a third threshold that is larger than the second threshold; and
writing the second data to the regular recording region without an accompanying backhitch when it has been judged that the predicted second volume exceeds the third threshold, in response to the command sent after the first data group has been written to the regular recording region.

13. A computer program product for writing data with a device, the computer program product comprising a computer readable storage medium having program code embodied therewith, the program code readable/executable by the device to:
accumulate, by the device, in a buffer, data sent from a higher order device;
in response to a command sent from the higher order device, selectively perform, by the device, either:
a first operation to write the data accumulated in the buffer to a regular recording region of a tape medium without an accompanying backhitch; or
a second operation to write the data accumulated in the buffer to a temporary recording region of the tape medium without an accompanying backhitch, and to subsequently write to the regular recording region a data group that includes the data written to the temporary recording region that has any gaps between data eliminated prior to writing to the regular recording region;
wherein the computer program product causes the device to function as:
an acquisition component adapted to acquire a first volume of first data, at a time that the first data has been written to the regular recording region, by either the first operation or the second operation having been performed in response to the command;
a prediction component adapted to predict a second volume of second data to be written in response to a command which is sent after the first data has been written to the regular recording region;
a judgment component adapted to judge whether or not the first volume acquired by the acquisition component exceeds a first threshold, and to judge whether or not the predicted second volume exceeds the first threshold, and to judge whether or not the predicted second volume exceeds a second threshold that is smaller than the first threshold; and
a control component adapted to:
control such that when the judgement component has judged that the acquired first volume exceeds the first threshold and the predicted second volume exceeds the second threshold, in response to the command sent after the first data has been written to the regular recording region, the first operation is performed for the second data; and
control such that when the judgment component has judged that the acquired first volume exceeds the first threshold and the predicted second volume does not exceed the second threshold, in response to the command sent after the first data has been written to the regular recording region, the second operation is performed for the second data.

* * * * *